US012136211B2

(12) United States Patent
Hasebe et al.

(10) Patent No.: US 12,136,211 B2
(45) Date of Patent: Nov. 5, 2024

(54) FERTILIZED EGG DEVELOPMENT STAGE DETERMINATION METHOD, RECORDING MEDIUM, IMAGING METHOD AND IMAGING APPARATUS

(71) Applicants: SCREEN Holdings Co., Ltd., Kyoto (JP); Miyake Clinic, Okayama (JP)

(72) Inventors: Ryo Hasebe, Kyoto (JP); Yasushi Kuromi, Kyoto (JP); Junichi Komiyama, Okayama (JP); Osamu Okitsu, Tokyo (JP)

(73) Assignees: SCREEN HOLDINGS CO., LTD., Kyoto (JP); Miyake Clinic, Okayama (JP)

( * ) Notice: Subject to any disclaimer, the term of this patent is extended or adjusted under 35 U.S.C. 154(b) by 359 days.

(21) Appl. No.: 17/581,200

(22) Filed: Jan. 21, 2022

(65) Prior Publication Data

US 2022/0301155 A1 Sep. 22, 2022

(30) Foreign Application Priority Data

Mar. 18, 2021 (JP) ................................. 2021-044304

(51) Int. Cl.
*G06T 7/00* (2017.01)
*G06V 10/22* (2022.01)
*G06V 10/764* (2022.01)

(52) U.S. Cl.
CPC ............ *G06T 7/0012* (2013.01); *G06V 10/22* (2022.01); *G06V 10/764* (2022.01);
(Continued)

(58) Field of Classification Search
CPC ......... G06T 7/0012; G06T 2207/10056; G06T 2207/10072; G06T 2207/10148; G06T 2207/30044; G06V 10/22; G06V 10/764
See application file for complete search history.

(56) References Cited

U.S. PATENT DOCUMENTS

2020/0110924 A1* 4/2020 Shinoda ............... G06V 10/764
2020/0126233 A1* 4/2020 Shinoda ............... C12M 41/46
(Continued)

FOREIGN PATENT DOCUMENTS

EP 3748334 A1 * 12/2020 ......... G01N 15/1475
JP 2011-192109 A 9/2011
(Continued)

OTHER PUBLICATIONS

Extended European Search Report issued in corresponding European Patent Application No. 22151901.0-1207, dated Jul. 4, 2022.

*Primary Examiner* — John J Lee
(74) *Attorney, Agent, or Firm* — Rimon P.C.

(57) ABSTRACT

A fertilized egg development stage determination method according to the invention includes: obtaining image data corresponding to an image of a fertilized egg captured by optical microscope; extracting a region corresponding to the fertilized egg in the image based on the image data and obtaining an index value indicating a degree of coincidence of the region with a circle; extracting a region corresponding to a zona pellucida of the fertilized egg in the image based on the image data and obtaining an index value indicating a thickness of the region; and determining a development stage of the fertilized egg based on the index value indicating the degree of coincidence, the index value indicating the thickness and determination criteria determined in advance for a combination of these index values.

14 Claims, 8 Drawing Sheets

(52) U.S. Cl.
CPC ............... *G06T 2207/10056* (2013.01); *G06T 2207/10072* (2013.01); *G06T 2207/10148* (2013.01); *G06T 2207/30044* (2013.01)

(56) References Cited

U.S. PATENT DOCUMENTS

2021/0042968 A1  2/2021  Kuromi et al.
2021/0056704 A1  2/2021  Kuromi et al.

FOREIGN PATENT DOCUMENTS

| JP | 2019-132710 A | 8/2019 |
| JP | 2019-133429 A | 8/2019 |

* cited by examiner

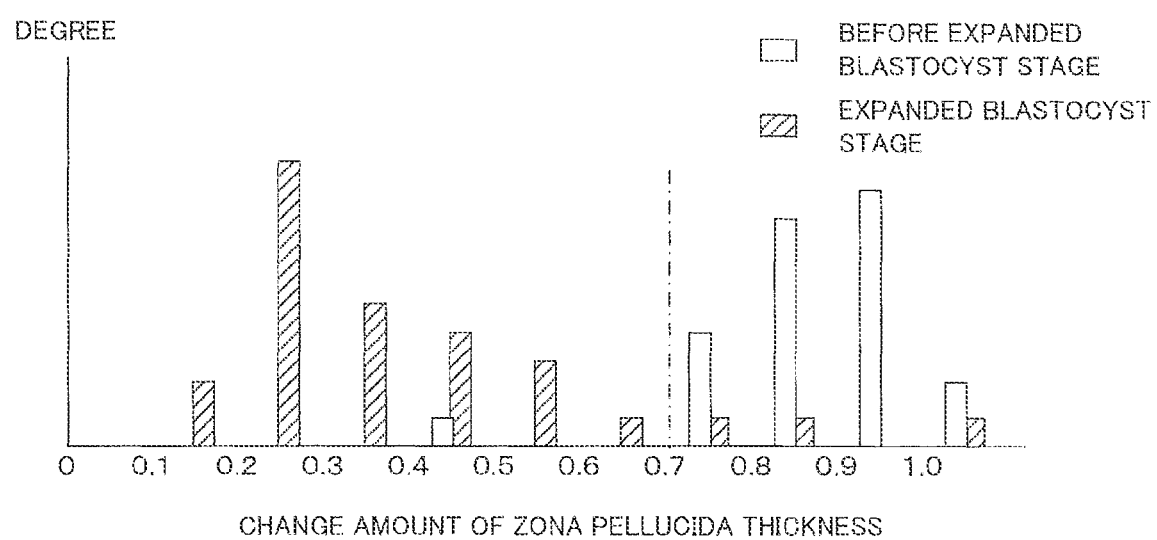

FERTILIZED EGG DEVELOPMENT STAGE DETERMINATION METHOD, RECORDING MEDIUM, IMAGING METHOD AND IMAGING APPARATUS

CROSS REFERENCE TO RELATED APPLICATION

The disclosure of Japanese Patent Application No. 2021-044304 filed on Mar. 18, 2021 including specification, drawings and claims is incorporated herein by reference in its entirety.

BACKGROUND OF THE INVENTION

1. Field of Invention

This invention relates to a technique for determining a development stage of a fertilized egg using image data obtained by imaging the fertilized egg.

2. Description of the Related Art

For example, in an assisted reproductive technology aimed at an infertility treatment, an embryo (fertilized egg) fertilized in vitro and cultured for a certain period is returned to a body. However, a pregnancy success rate (in the assisted reproductive technology) is not necessarily high and patient's mental and economic burdens are large. To solve this problem, a method for precisely judging a state of an embryo being cultured is sought for.

Conventionally, it is a general practice that a doctor or embroidery cultivator visually evaluates whether or not an embryo culture is satisfactorily in progress, for example, by microscopic observation. Veeck classification, Gardner classification and the like are, for example, widely used as judgment indices, but these merely show approximate judgment criteria for morphological features of an embryo and final evaluation depends on the subjective judgment of an evaluator at present. Thus, a technique for enabling an objective and quantitative evaluation is required.

To meet such a requirement, the present applicant previously disclosed JP2019-132710A and JP2019-133429A. A method for discriminating and dividing trophectoderms and an inner cell mass from a three-dimensional image of an embryo (fertilized egg) captured by a non-invasive tomography technique such as an optical coherence tomography (OCT) is described in these patent literature.

SUMMARY OF THE INVENTION

In observing a state of a fertilized egg, particularly a change thereof, the fertilized egg needs to be repeatedly imaged at certain time intervals. However, a long imaging time is required for OCT imaging, for example, as compared to optical microscope imaging. Thus, particularly in the case of observing a plurality of fertilized eggs in parallel, there is a problem that an imaging interval becomes long if an attempt is made to image these fertilized eggs by OCT. From this, it is difficult to constantly image all the fertilized eggs in turn by OCT and it is realistic to select and preferentially image the fertilized eggs particularly requiring a follow-up observation. Here, the fertilized eggs to be preferentially imaged are, for example, fertilized eggs in a transition period in which a development stage changes.

A method for quantifying and evaluating trophectoderms, an inner cell mass, a zona pellucida and the like, which are constituent elements of the fertilized egg, by an image analysis is thought as a means for determining a development stage of the fertilized egg. However, a method for accurately determining a stage from luminance information of an OCT image is not established yet at present. Further, since the OCT imaging takes time as described above, the OCT imaging cannot be said to be suitable for such a usage in which a stage of each of many fertilized eggs is required to be determined.

To solve these problems, it is desired to establish a method for objectively and accurately determining in which development stage a fertilized egg is from images regularly captured, for example, by optical microscope imaging capable of imaging in a shorter time.

This invention was developed in view of the above problem and aims to provide a technique capable of objectively and accurately determining a development stage of a fertilized egg using image data obtained by the optical microscope imaging of the fertilized egg.

A first aspect of this invention is directed to a fertilized egg development stage determination method, the method including, to achieve the above object, obtaining image data corresponding to an image of a fertilized egg captured by optical microscope; extracting a region corresponding to the fertilized egg in the image based on the image data and obtaining an index value indicating a degree of coincidence of the region with a circle; extracting a region corresponding to a zona pellucida of the fertilized egg in the image based on the image data and obtaining an index value indicating a thickness of the region; and determining a development stage of the fertilized egg based on the index value indicating the degree of coincidence, the index value indicating the thickness and determination criteria determined in advance for a combination of these index values.

In the thus configured invention, focusing on a (hatching) phenomenon in which the zona pellucida first becomes thinner (expanded blastocyst stage) and, thereafter, cells inside project out from the zona pellucida in a stage after the expanded blastocyst stage, out of the development stages of the fertilized egg, the development stage of the fertilized egg is determined from an optical microscope image. Specifically, the development stage is determined by a combination of the index value indicating the thickness of the region corresponding to the zona pellucida extracted from the image and the index value indicating how close to a circle the outer shape of the fertilized egg is. Although described in detail later, an objective and accurate determination becomes possible by performing an automatic determination using the index values quantified in view of morphological features of the fertilized egg in each development stage in this way.

A second aspect of this invention is directed to a computer-readable recording medium non-transitorily storing a program for causing a computer to perform each operation in the above method. The above method is suitable for execution by a computer device, and by realizing it as a program, it becomes possible to make a determination using existing hardware resources.

A third aspect of this invention is directed to an imaging method, the method including: determining the development stage of the fertilized egg by the fertilized egg development stage determination method; and performing optical coherence tomography imaging of the fertilized egg according to a determination result.

A fourth aspect of this invention is directed to an imaging apparatus, the apparatus including: a two-dimensional image acquirer configured to obtain two-dimensional image data by imaging of a fertilized egg with an optical microscope; a three-dimensional image acquirer configured to obtain three-dimensional image data by imaging of the fertilized egg with an optical coherence tomography; and an image processor configured to extract a region corresponding to the fertilized egg in the image based on the two-dimensional image data, obtain an index value indicating a degree of coincidence of the region with a circle, extract a region corresponding to a zona pellucida of the fertilized egg in the image based on the two-dimensional image data, obtain an index value indicating a thickness of the region and determine a development stage of the fertilized egg based on the index value indicating the degree of coincidence, the index value indicating the thickness and determination criteria determined in advance for a combination of these index values, the imaging of the fertilized egg with the optical coherence tomography being performed by the three-dimensional image acquirer according to a determination result of the image processor.

In the thus configured invention, the development stage of the fertilized egg is determined from an optical microscope image, and the optical coherence tomography imaging, i.e. OCT imaging is performed according to that determination result. In this way, the stage of the fertilized egg is determined from the image obtained by the optical microscope imaging capable of imaging in a short time and the OCT imaging capable of obtaining a detailed three-dimensional image of the fertilized egg is performed at a necessary timing from that determination result, whereby a state change of the fertilized egg can be efficiently observed.

As described above, according to the invention, the development stage of the fertilized egg can be objectively and accurately determined by performing quantification based on a characteristic shape in the development stage of the fertilized egg using an image obtained by the optical microscope image capable of imaging in a short time. Further, a timing of the OCT imaging can be precisely grasped by using that determination result.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

BRIEF DESCRIPTION OF THE DRAWING

FIG. 10 is a graph showing a distribution of the thickness change amounts of the zona pellucida of the embryos.

DETAILED DESCRIPTION OF THE PREFERRED EMBODIMENTS

Figure 1:
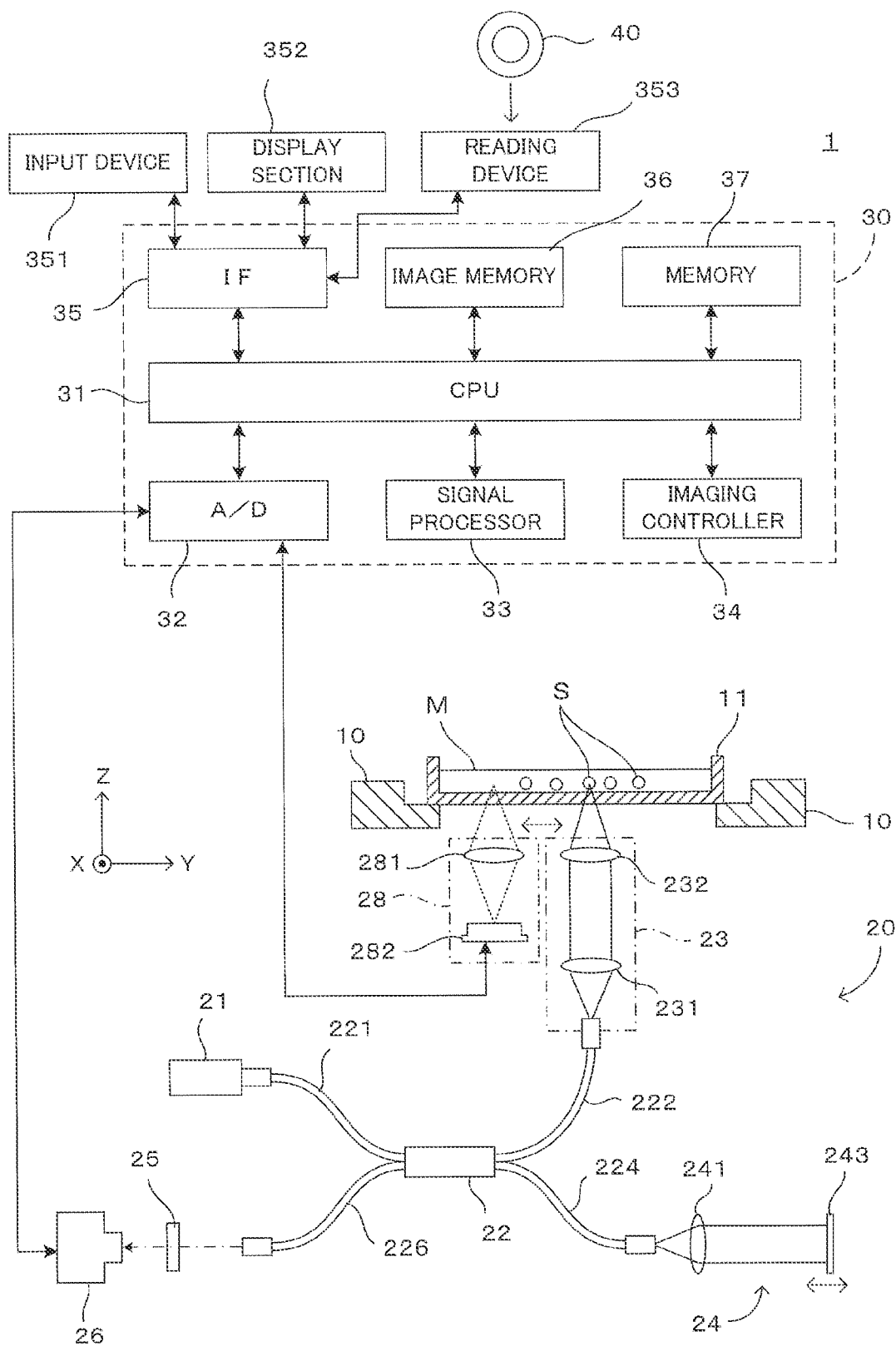
FIG. 1 is a diagram showing a schematic configuration of a preferred image processing apparatus as an execution subject of an image processing method according to the invention.

FIG. 1 is a diagram showing a schematic configuration of a preferred image processing apparatus as an execution subject of an image processing method according to the invention. This image processing apparatus 1 tomographically images a specimen carried in a liquid, e.g. an embryo (fertilized egg) cultured in a culture liquid. Then, the obtained tomographic image is processed to generate a cross-sectional image showing the structure of one cross-section of the specimen. Further, a three-dimensional image of the specimen is generated from a plurality of tomographic images. XYZ orthogonal coordinate axes are set as shown in FIG. 1 to indicate directions in the drawings to comprehensively show directions in each figure. Here, an XY plane represents a horizontal plane. Further, the Z axis represents a vertical axis and, more particularly, a (−Z) direction represents a vertically downward direction.

The imaging apparatus 1 comprises a holder 10. The holder 10 holds in an approximately horizontal posture a container 11 storing a specimen S to be imaged. The container 11 is, for example, a shallow plate-like container having a flat bottom surface and called a "dish" in which a recess capable of supporting the liquid is formed on the upper surface of the plate-shaped member. A culture medium M such as culture liquid is poured in the container 11, and a fertilized egg as a specimen S is carried inside.

Although a plurality of specimens S are carried in the specimen container 11 having a single recess in this example, there is no limitation to this. For example, the specimen container 11 may be a well plate in which a plurality of recesses called wells are arranged in one plate-like member. In this case, the plurality of specimens S can be carried one by one in the plurality of wells. Further, for example, a plurality of dishes each carrying the specimen S may be held by the holder 10 while being arranged side by side in a horizontal direction, and subjected to imaging.

The imager 20 is arranged below the container 11 held by the holder 10. An OCT (Optical Coherence tomography) device capable of capturing a tomographic image of an imaging object in a non-contact and non-destructive (non-invasive) manner is used as the imager 20. As described in detail later, the imager 20, which is an OCT device, includes a light source 21 for generating illumination light to the imaging object, an optical fiber coupler 22, an objective optical system 23, a reference optical system 24, a spectrometer 25 and a photodetector 26.

The imager 20 further includes a microscopic imaging unit 28 for optical microscope imaging. More specifically, the microscopic imaging unit 28 includes an imaging optical system 281 and an imaging element 282. The imaging optical system 281 includes an objective lens that can be focused on the sample S in the sample container 11. For example, a CCD imaging element, a CMOS sensor or the like can be, for example, used as the imaging element 282. The microscopic imaging unit 28 is preferably capable of bright field imaging or phase difference image. The objective optical system 23 and the microscopic imaging unit 28 are supported by a support member (not shown) movable in a horizontal direction and the positions thereof in the horizontal direction can be changed.

The image processing apparatus 1 further comprises a control unit 30 which controls an operation of the apparatus and a driving mechanism (not shown) which drives movable parts of the imager 20. The control unit 3 includes a CPU (Central Processing Unit) 31, an A/D convertor 32, a signal processor 33, an imaging controller 34, an interface (I/F) section 35, an image memory 36 and a memory 37.

The CPU 31 governs operations of the entire apparatus by executing a predetermined control program, thereby realizes various processing described later. The control program executed by the CPU 301 and data which are generated during processing are stored in the memory 37. The A/D convertor 32 converts signals which the photo-detector 26 and the imaging element 282 of the imager 20 output in accordance with the amount of received light into digital image data. The signal processor 33 performs image processing described later based upon a digital data outputted from the A/D converter 32, thereby generates various images such as the tomographic image and 3D image of the imaging object. The image memory 36 saves the image data thus generated.

The imaging controller 34 controls the imager 20 to execute imaging process. Specifically, the imaging controller 34 set the objective optical system 23 for tomographic imaging and the microscopic imaging unit 28 selectively to an imaging position where the specimen S is included in an imaging field of view. When the objective optical system 23 is positioned at the imaging position, the imaging controller 34 causes the imager 20 to execute an OCT imaging process described later for obtaining 3D image data indicating a solid structure of the specimen S. On the other hand, when the microscopic imaging unit 28 is positioned at the imaging position, the imaging controller 34 causes the imager 20 causes the microscopic imaging unit 28 to obtain 2D image data corresponding to a planar image of the specimen S formed on a receiving surface of the imaging element 282.

The interface section 35 realizes communication between the image processing apparatus 1 and outside. More specifically, the interface section 35 has a function of communicating with external equipment, and a user interface function of accepting manipulation by a user and informing the user of various types of information. For achieving these objects, the interface section 35 comprises an input device 351 and a display section 352. The input device 351 includes, for instance a key board, a mouse, a touch panel or the like which can accept manipulation and entry concerning selection of the functions of the apparatus, setting of operating conditions, etc. Further, the display section 352 includes a liquid crystal display for example which shows various types of processing results such as the tomographic images and the 3D images generated by the imager 20.

[0026-1]

Further, to provide the above control program from the outside of the apparatus, a reading device 353 for reading the above control program from a computer-readable recording medium 40 (e.g. optical disk, magnetic disk, magneto-optical disk) non-transitorily storing the above control program may be connected to an interface unit 35 as appropriate. In the case of using the recording medium 40, the CPU 31 reads out the program from the recording medium 40 via the reading device 353 in advance and develops the program in the memory 37. Then, the CPU 31 performs an arithmetic processing in accordance with the program stored in the memory (i.e. the control unit 30 executes the program), whereby each component of the apparatus configured as described next is controlled. Note that, besides being read from the recording medium 40, the control program can be implemented in the control unit 30 by being received via an electric communication line.

In the imager 20, from the light source 21 which includes a light emitting element such as a light emitting diode or a super luminescent diode (SLD) for instance, a low-coherence light beam containing wide-range wavelength components is emitted. For imaging the specimen such as cells or the like, an infrared light can be used favorably to make illumination light penetrate into the specimen.

The light source 21 is connected one optical fiber 221 of optical fibers constituting the optical fiber coupler 22. Low-coherence light emitted from the light source 21 is branched into lights to two optical fibers 222, 224 by the optical fiber coupler 22. The optical fiber 222 constitutes an object side optical path. More specifically, light emitted from an end part of the optical fiber 222 is incident on an objective optical system 23.

The objective optical system 23 includes a collimator lens 231 and an objective lens 232. Light emitted from an end part of the optical fiber 222 is incident on the objective lens 232 via the collimator lens 231. The objective lens 232 has a function of converging light (observation light) from the light source 21 to the specimen and a function of condensing reflected light from the specimen and causing the condensed reflected light toward the optical fiber coupler 22. Although a single objective lens 232 is shown in FIG. 1, a plurality of optical elements may be combined. Reflected light from the imaging object is incident as signal light on the optical fiber 222 via the objective lens 232 and the collimator lens 231. An optical axis of the objective lens 232 is orthogonal to the bottom surface of the container 11 and, in this example, an optical axis direction coincides with a vertical axis direction.

The CPU 31 sends a control command to the imaging controller 34. In response to the control command, the imaging controller 34 causes the imager 20 to move to a predetermined direction. More specifically, the imaging controller 34 makes the imager 20 move in a horizontal direction (XY direction) and a vertical direction (Z direction). By a movement of the imager 20 in the horizontal direction, the imaging field of view moves in the horizontal direction. Further, by a movement of the imager 20 in the vertical direction, a focus position of the objective optical system 23 along the optical axis direction changes relative to the specimen S as the imaging object.

Part of light incident on the optical fiber coupler 22 from the light source 21 is incident on the reference optical system 24 via an optical fiber 224. The reference optical system 24 includes a collimator lens 241 and a reference mirror 243. These constitute a reference system optical path together with the optical fiber 224. Specifically, light emitted from an end part of the optical fiber 224 is incident on the reference mirror 243 via the collimator lens 241. The light reflected by the reference mirror 243 is incident as reference light on the optical fiber 223.

The reference mirror 243 is supported by an advancing/retracting member (not shown). The advancing/retracting mechanism operates in response to a control command from the imaging controller 34, and includes an appropriate mechanism for advancing and retracting the reference mirror 243 in a Y direction, e.g. a linear motor or a ball screw mechanism. By moving the reference mirror 243 in Y direction, that is, a direction advancing to or retracting from the collimator lens 241, an optical path length of the reference light reflected by the reference mirror specimen 241 is adjusted.

The reflected light (signal light) reflected by a surface or an internal reflecting surface of the specimen and reference light reflected by the reference mirror 243 are mixed in the optical fiber coupler 22 and incident on the photo-detector 26 via the optical fiber 226. At this time, interference due to a phase difference between the reflected light and the reference light occurs, but an optical spectrum of interference light differs depending on a depth of the reflecting surface. That is, the optical spectrum of the interference light has information on a depth direction of the imaging object. Thus, a reflected light intensity distribution in the depth direction of the imaging object can be obtained by spectrally diffracting the interference light at each wavelength to detect a light quantity and Fourier transforming a detected interference signal. An OCT imaging technique based on such a principle is called Fourier domain OCT (FD-OCT).

The imager 20 of this embodiment is provided with a spectroscope 25 on an optical path of the interference light from the optical fiber 226 to the photo-detector 26. A spectroscope utilizing a prism, a spectroscope utilizing a diffraction grating and the like can be, for example, used as the spectroscope 25. The interference light is spectrally diffracted for each wavelength component and received by the photo-detector 26.

By Fourier-transforming the interference signal output from the photo-detector 26 according to the interference light detected by the photo-detector 26, the reflected light intensity distribution of the specimen in the depth direction, i.e. in the Z direction at the incident position of the illumination light is obtained. By scanning the illumination light incident on the container 11 in the X direction, the reflected light intensity distribution in a plane parallel to an XZ plane is obtained, with the result that a tomographic image of the specimen having this plane as a cross-section can be generated. A principle of generation of the tomographic image is not described because it is known.

Images are obtained by changing the incident position of the light along the Y direction over multiple steps and imaging a tomographic image for every change. By doing so, a number of tomographic images of the specimen are obtained along cross-sectional surfaces which are parallel to the XZ plane. As the scan pitch in the Y direction is reduced, it is possible to obtain image data with sufficient resolution to grasp the stereoscopic structure of the specimen. From these tomographic image data, 3D image data (voxel data) corresponding to a body of the specimen can be obtained.

As just described, this image processing apparatus 1 has a function of obtaining an image of the specimen S carried together with the culture medium M in the container 11. Obtainable images include two-dimensional image data obtained by optical microscope imaging, tomographic image data obtained by OCT imaging and three-dimensional image data based on the tomographic image data.

One mode of the image processing executable using the image processing apparatus 1 configured as described above is described below. This image processing corresponds to one embodiment of a fertilized egg development stage determination method and an imaging method according to the invention. The image processing in this embodiment is a processing of obtaining three-dimensional images of a fertilized egg (hereinafter, merely referred to as an "embryo") as the specimen S before and after a blastocyst stage at necessary timings.

For example, as known as Gardner classification, an embryo development process is classified as several development stages, and a three-dimensional image is useful particularly in observing and evaluating an embryo immediately after a transition from one stage to the next stage. OCT imaging is suitable to multilaterally observe and evaluate the embryo from various directions since a three-dimensional image of an embryo to be evaluated, but requires a relatively long time (e.g. several minutes) for imaging. Thus, in the case of successively imaging and evaluating a plurality of embryos, an imaging interval for one embryo becomes long, whereby a problem of being unable to obtain a three-dimensional image at a necessary timing possibly arises.

Accordingly, in this embodiment, an embryo is imaged in time lapse at certain time intervals by the microscopic imaging unit 28 capable of obtaining an image in a shorter time, and the CPU 31 performs the development stage determination for the embryo based on the obtained images. The imager 20 performs the OCT imaging for the embryo judged to be necessary from the determination result.

Figure 2A:
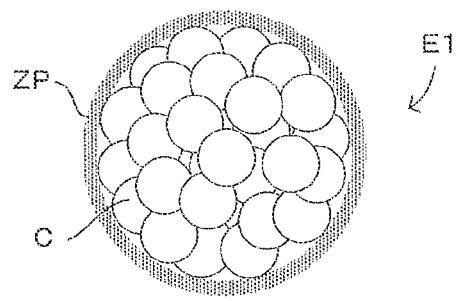
FIGS. 2A to 2D are views schematically showing the structure of an embryo serving as a specimen in this embodiment.

FIGS. 2A to 2D are views schematically showing the structure of an embryo serving as a specimen in this embodiment. As already known, if an egg is fertilized, cleavage starts and a blastocyst is formed through a state called a morula. FIG. 2A schematically shows an embryo E1 in a morula stage. The embryo E1 in this state is structured such that a mass of a multitude of cells C generated by cleavage is wrapped by a zona pellucida ZP, which is a membrane mainly containing a glycoprotein and having a substantially uniform thickness.

Figure 2B:
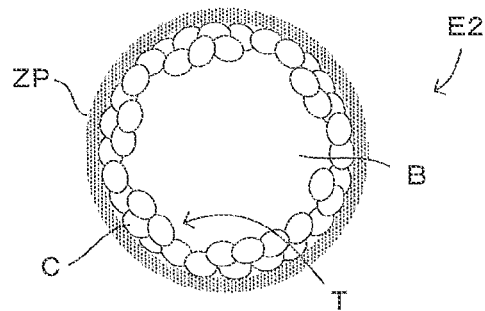
Figure 2C:
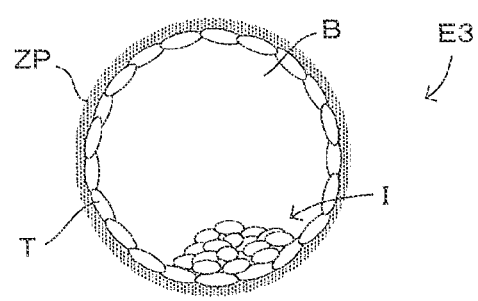

FIG. 2B schematically shows an embryo E2 in an initial blastocyst stage. In the initial blastocyst stage, a cavity called a blastocoel B is formed inside the embryo E2. More specifically, the cells C progressed in cleavage are arranged in a laminated manner on a surface of the embryo (inside the zona pellucida ZP) to form trophectoderms T, and an internal space surrounded by the trophectoderms T forms the blastocoel B.

The trophectoderms T have a thickness varying depending on position and are distributed to adhere to the entire inner surface of the zona pellucida ZP. If the trophectoderms T grow, the trophectoderms T become a thin layer substantially made of one layer of the cells C and an inner cell mass I is formed by many cells concentrated in one location (blastocyst stage) like an embryo E3 shown in FIG. 2C. As the growth progresses, the blastocoel B expands and the embryo E3 becomes larger, whereas the zona pellucida ZP becomes thinner (expanded blastocyst stage).

Figure 2D:
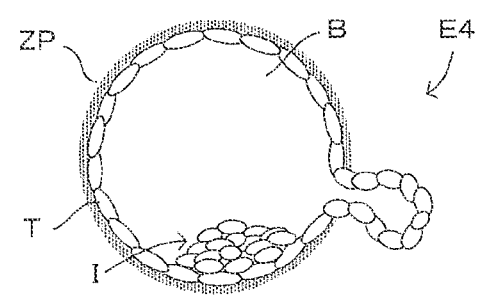

Then, like an embryo E4 shown in FIG. 2D, the hatching of the inner cells from the zona pellucida ZP starts (hatching blastocyst stage) and, finally, all the cells are hatched and implanted in a uterus, whereby pregnancy is reached. In the assisted reproductive technology, assisted hatching of inducing artificial hatching by an external stimulus is also performed.

In the image processing of this embodiment, the development stages substantially from the initial blastocyst stage to the hatching blastocyst stage centered on the expanded blastocyst stage are automatically determined from optical microscope images. The principle of the automatic determination is first described and specific processing contents are subsequently described. Note that, in the following description, a "stage before the expanded blastocyst stage" is a collective concept of the development stages (e.g. morula stage, initial blastocyst stage) before the expanded blastocyst stage and does not include the expanded blastocyst stage. Further, a "stage after the expanded blastocyst stage" is a collective concept of the development stages (e.g. hatching blastocyst stage, post-hatching blastocyst stage) after the expanded blastocyst stage and does not include the expanded blastocyst stage. Further, the "development stage" may be merely called a "stage".

In a bright field image or phase difference image obtained by optical microscope imaging, it is relatively easy to distinguish a zona pellucida from other structures from luminance and texture differences thereof. In a satisfactorily cultured embryo, the zona pellucida has a substantially uniform thickness. In the stage before the expanded blastocyst stage, i.e. from an initial stage of development to the initial blastocyst stage, the thickness of the zona pellucida ZP does not largely vary, but the zona pellucida ZP becomes thinner in the expanded blastocyst stage. From this, it is expected that the expanded blastocyst stage and the stages before that can be discriminated using the thickness of the zona pellucida appearing in the images as an index.

On the other hand, in the discrimination of the expanded blastocyst stage and the stages thereafter, the thickness of the zona pellucida ZP is not an effective index. For this discrimination, it is through to use the outer shape of the embryo as an index. From the initial stage of development to the expanded blastocyst stage, the embryo has a substantially spherical outer shape and is substantially circular in the image. In contrast, after the start of hatching, the outer shape of the embryo largely deviates from a spherical shape. From this, it can be expected that the expanded blastocyst stage and the stages thereafter can be discriminated using to which extent the outer shape of the embryo is close to a circle in the image as an index.

From the above, the present inventors came up with a technical idea of automatically determining in which development stage, out of the stage before the expanded blastocyst stage, the expanded blastocyst stage and the stage after the expanded blastocyst stage, an embryo is by combining an index value indicating the thickness of the zona pellucida ZP and an index value indicating the outer shape of the embryo, more specifically, a degree of coincidence with a circle. As a preparation stage for that, many embryo images, from which the development stages are determined by a skilled embroidery cultivator, were collected and a correlation between the index values obtained from those images and determination results was examined. A result of that is described below.

Figure 3:
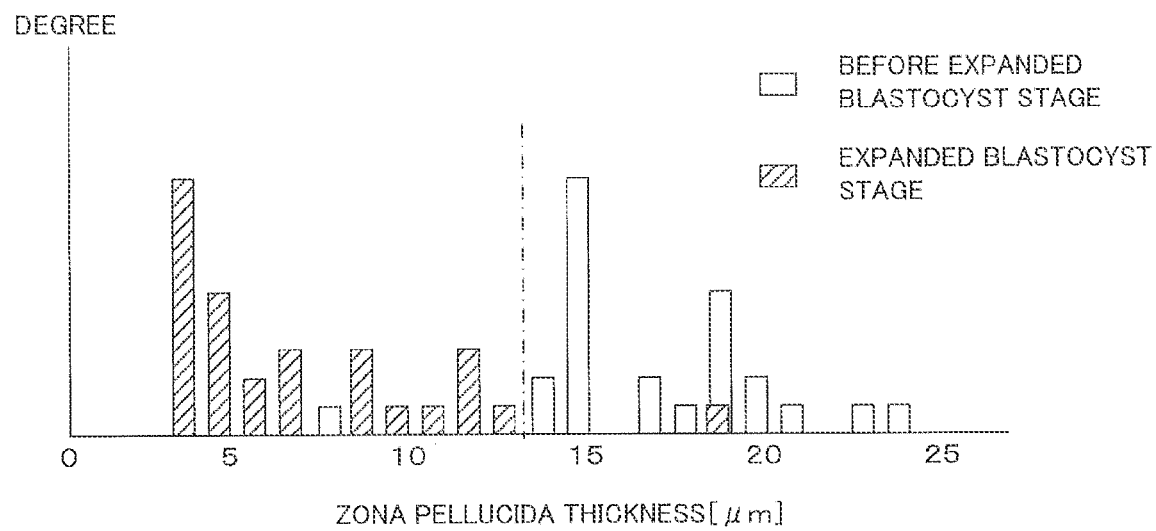
FIG. 3 is a graph showing a distribution of zona pellucida thicknesses of embryos.

FIG. 3 is a graph showing a distribution of zona pellucida thicknesses of embryos. The thickness of the zona pellucida ZP was measured at a plurality of positions for one embryo, a median value or average value of those measurement values was set as an index value typically indicating the thickness of the zona pellucida of this embryo. The thickness of the zona pellucida ZP has a large individual difference from about 3 µm to 20 µm or more depending on the embryo. However, there is a remarkable tendency that the zona pellucida ZP is relatively thick in the expanded blastocyst stage while distributed in a thin range before the expanded blastocyst stage as shown in FIG. 3. A boundary between thick and thin ranges is substantially about 13 µm. Therefore, by evaluating the thickness of the zona pellucida ZP using this value as a threshold value T1, the expanded blastocyst stage and the stages therebefore can be discriminated.

Figure 4:
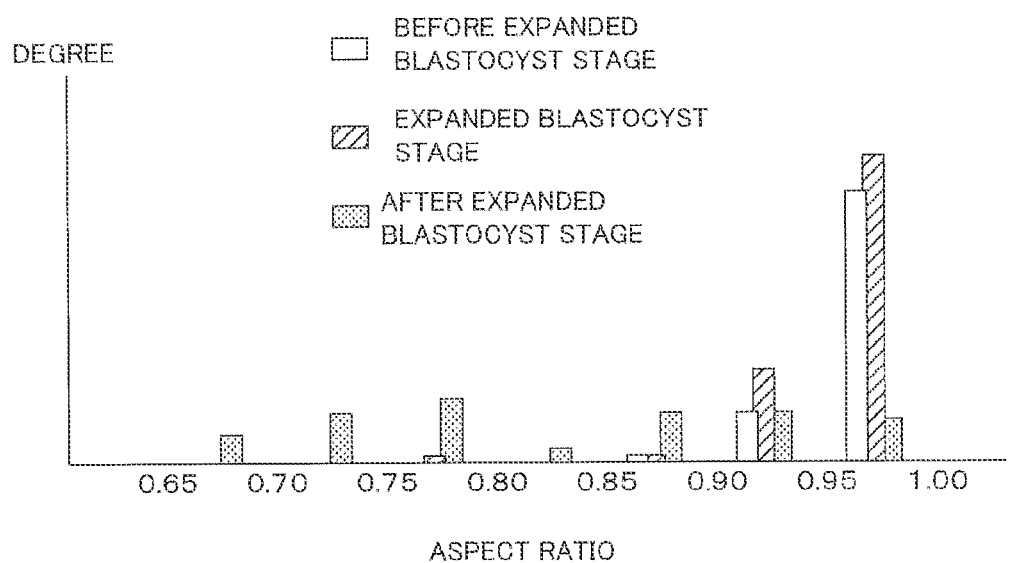
FIG. 4 is a graph showing a distribution of aspect ratios of the embryos.

FIG. 4 is a graph showing a distribution of aspect ratios of the embryos. Various values can be considered as the index value indicating the degree of coincidence of the shape of the embryo with a circle in an image. Here a circumscribing rectangle having a smallest area, out of circumscribing rectangles of the embryo, i.e. rectangles circumscribing the peripheral edge of the embryo, is specified, and expressed by an aspect ratio which is a ratio of short sides and long sides. If the embryo is circular, the circumscribing rectangle is a square and the aspect ratio is 1. Unless otherwise, the aspect ratio is smaller than 1 and decreases as the shape of the embryo deviates more from the circle. Therefore, the degree of coincidence of the shape of the embryo and the circle can be expressed by the aspect ratio defined in this way.

A calculation for specifying a circumscribing rectangle of an image object is implemented as a standard function in a general image processing software. Thus, the processing is facilitated by using the aspect ratio using that result as the index value for the shape of the embryo. Besides, similar results are expected to be obtained even if a degree of circularity obtained for the contour of the embryo is, for example, used as the index value.

As shown in FIG. 4, in the expanded blastocyst stage and the stages before that, the aspect ratio is substantially close to 1 and no significant difference is seen between the both stages. On the other hand, in the embryo after the expanded blastocyst stage, a center of the distribution shifts to a region where the aspect ratio is low.

Figure 5:
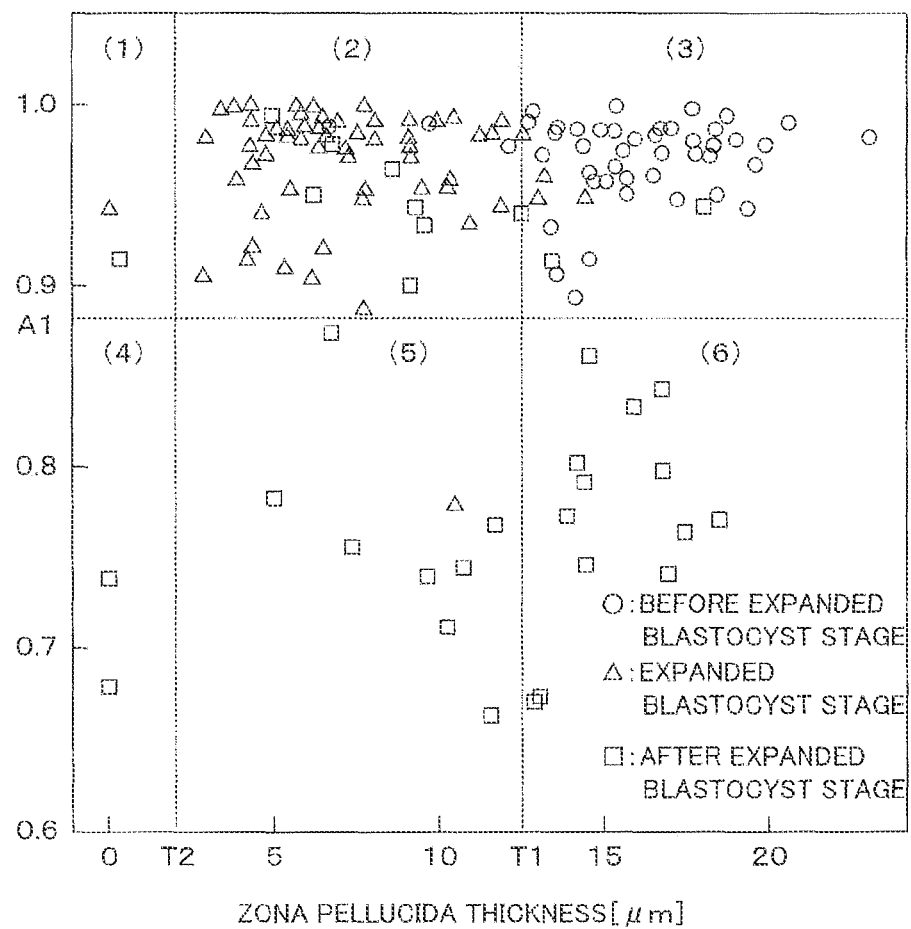
FIG. 5 is a graph showing a distribution of the embryos when the two index values are combined.

FIG. 5 is a graph showing a distribution of the embryos when the two index values are combined. More specifically, FIG. 5 is a scatter diagram plotting positions occupied by the respective embryos by these index values in a two-dimensional coordinate plane having a horizontal axis and a vertical axis respectively representing the two index values (zona pellucida thickness, aspect ratio). FIG. 5 can also be said to be a graph showing a distribution in a two-dimensional feature quantity space when the two index values are respectively regarded as feature quantities.

It is found from FIG. 5 that the embryos before the expanded blastocyst stage indicated by circular marks are concentrated on a right-upper side of FIG. 5, the embryos in the expanded blastocyst stage indicated by triangular marks are concentrated on a left-upper side of FIG. 5 and the embryos after the expanded blastocyst stage indicated by square marks are concentrated on a lower side of FIG. 5. From such a distribution tendency, the coordinate plane can be divided into six regions (1) to (6) using threshold values A1, T1 and T2 represented by dotted lines in FIG. 5. A value of the threshold value A1 empirically obtained from the scatter diagram is about 0.88. Further, values of the threshold values T1, T2 are respectively about 13 µm and 2 µm.

Out of these regions, the region (3) is thought to correspond to the development stage before the expanded blastocyst stage since the zona pellucida is thicker than the threshold value T1, the aspect ratio is close to 1 and the outer shape of the embryo is substantially circular. Further, the region (2) is thought to correspond to the expanded blastocyst stage since the outer shape of the embryo is substantially circular, but the zona pellucida ZP is thinner than the threshold value T1.

Further, the region (5) is thought to correspond to the stage after the expanded blastocyst stage since the zona pellucida is thin, the aspect ratio is smaller than the threshold value Al and the outer shape of the embryo deviates from a circle. In some blastocysts after hatching, the detected thickness of the zona pellucida ZP may be substantially zero while the outer shape is spherical (circular in the image). The regions (1) and (4) where the zona pellucida ZP is very thin, i.e. smaller than the threshold value T2 can be thought to correspond to such a state.

In the region (6), the thickness of the zona pellucida ZP is larger than the threshold value T1 and in a state before the expanded blastocyst stage in this aspect, but the aspect ratio is small and the outer shape of the embryo largely deviates from the circle. This state is thought to correspond to the embryo to which assisted hatching was applied. Assisted hatching is a treatment for promoting the hatching of a fertilized egg by partially cutting a zona pellucida using, for example, laser light. The region (6) can be thought to correspond to a state where the zona pellucida is cut before becoming sufficiently thin, whereby hatching is started and the outer shape collapses.

As just described, in which development stage the embryo to be evaluated is can be objectively and automatically determined by quantifying the state of the embryo by a combination of the index value corresponding to the thickness of the zona pellucida ZP and the index value indicating the outer shape and performing a determination based on the threshold values provided for each evaluation value. By determining the threshold values based on determination results by a sufficiently trained specialist (specifically, embroidery cultivator), it is possible to obtain determination results not inferior to determinations by the specialist.

Here, the method for creating determination criteria for determining in which development stage the embryo is from the two index values by dividing the feature quantity space into a plurality of regions by simple threshold values and associating the development stages with the respective regions is described. Besides this, it is also possible to create determination criteria using, for example, a known classification technique. That is, the embryos in each development stage can be thought to form a cluster for each development stage in the two-dimensional feature quantity space. Accordingly, if boundaries of clusters occupied in the two-dimensional feature quantity space in each development stage are specified using an appropriate learning algorithm, the stage can be determined by judging, from the feature quantities obtained for an embryo to be evaluated, to which cluster the embryo belongs.

The principle of the embryo development stage determination in this embodiment is described above. Next, specific processing contents of the image processing of this embodiment incorporated with the stage determination based on the above principle are described. Here, the method using the threshold values shown in FIG. 5 as the determination criteria is adopted.

Figure 6:
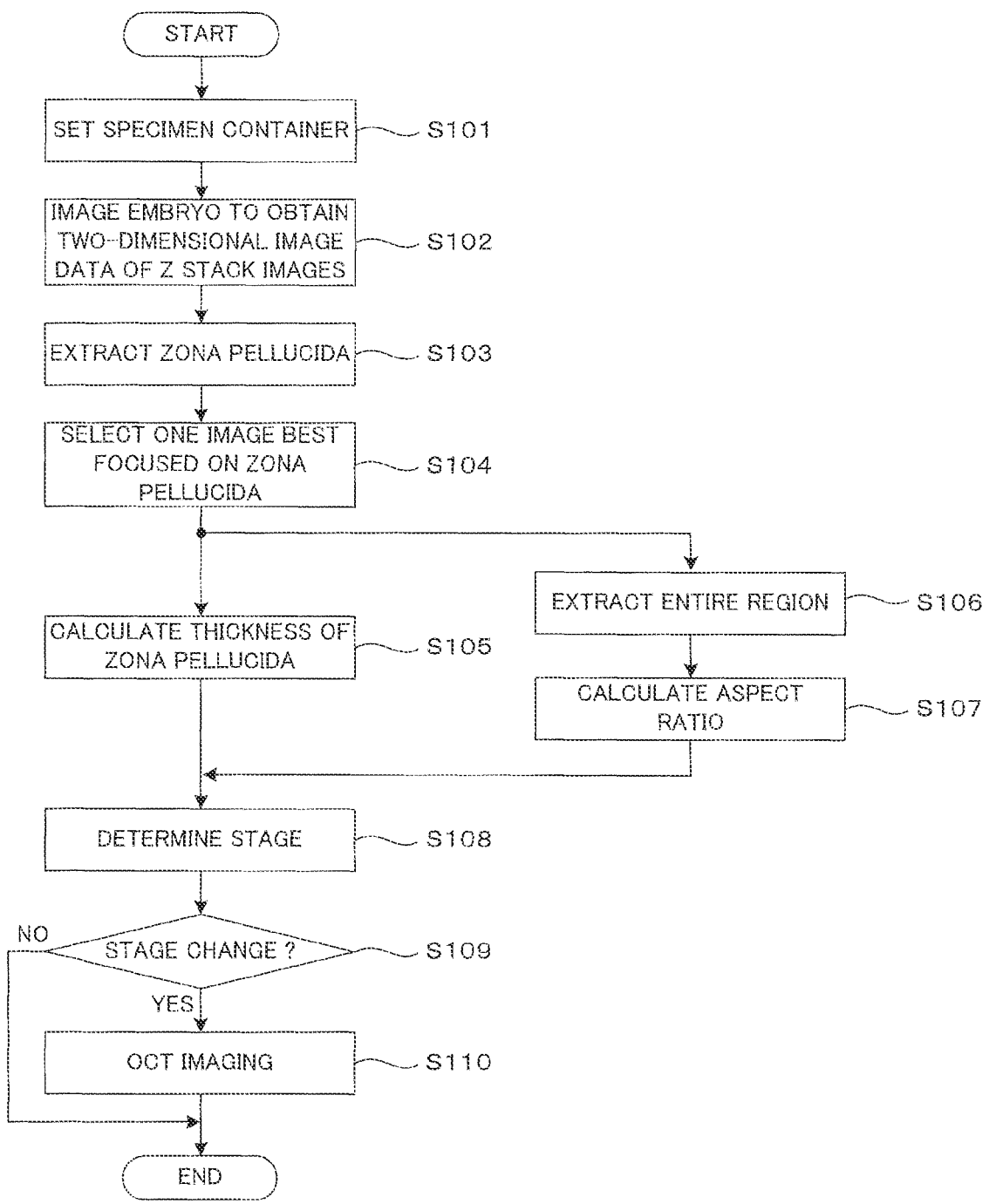
FIG. 6 is a flow chart showing the image processing in this embodiment.

FIG. 6 is a flow chart showing the image processing in this embodiment. As described above, this processing is realized by the CPU 31 executing the control program prepared in advance and causing each component of the apparatus to perform a predetermined operation and regularly image the specimen S. If the specimen container 11 storing an embryo to be evaluated is taken out from an incubator and set in the holder 10 (Step S101), the optical microscope imaging is performed by the microscopic imaging unit 28 with this embryo set as an object to be imaged.

In a process of Steps S102 to S105, the two-dimensional image data of the embryo is obtained by optical microscope imaging of the embryo and a thickness of a zona pellucida is calculated based on the image data. Specifically, the microscopic imaging unit 28 positioned at an imaging position where the embryo to be evaluated can be included in the imaging field of view, a focus position is changed and set in a multi-step manner in a depth direction (Z direction), and imaging is performed every time. In this way, a set including a plurality of two-dimensional images having mutually different focus depths, i.e. so-called Z stack images, are obtained (Step S102).

A region corresponding to the zona pellucida ZP is extracted from each of these images (Step S103). Out of the plurality of images, one image best focused on the zona pellucida ZP is selected (Step S104). A thickness of the zona pellucida ZP is calculated based on the selected image (Step S105). These processings, i.e. the processing of extracting the region corresponding to the zona pellucida ZP (Step S103), the processing of selecting the best focused image (Step S104) and the processing of calculating the thickness of the zona pellucida ZP (Step S105) are described in detail later. The thickness of the zona pellucida ZP in the embryo E to be evaluated becomes known by the process thus far. The thickness of the zona pellucida ZP thus obtained is used as the first index value.

Further, an entire region corresponding to one entire embryo is extracted from an image most focused on the zona pellucida ZP, i.e. an image having a clearest contour of the embryo (Step S106). The entire region can be extracted by an image processing similar to that for the extraction of the zona pellucida ZP. The aspect ratio of the embryo is calculated from the thus extracted entire region (Step S107). Specifically, the image is binarized based on an extraction result of the entire region. Then, a rectangle having changeable long sides, short sides and rotation angle is fit to the entire region and, out of rectangles (circumscribing rectangles) circumscribing the peripheral edge of the entire region, the one having a smallest area is searched. A ratio of the short sides to the long sides of this circumscribing rectangle is set as the aspect ratio and the aspect ratio is set as a second index value.

By applying the thus obtained two index values to the predetermined determination criteria, the development stage of the embryo is determined (Step S108). Specifically, the two index values including the zona pellucida thickness and the aspect ratio and the threshold values for the respective index values obtained in advance based on the above principle are compared, and the development stage of the embryo is determined based on in which of the above regions (1) to (6) the embryo to be evaluated is located.

Subsequently, the development stage determination result of this embryo is compared to the determination result by the previous imaging (Step S109). If a change of the development stage from the previous imaging is judged (YES in Step S109), the imager 20 images this embryo by OCT. By so doing, a three-dimensional image of this embryo is obtained every time the development stage of the embryo changes. On the other hand, if there is no change in the development stage (NO in Step S109), the OCT imaging is skipped. By so doing, unnecessary OCT imaging is omitted, wherefore a delay of imaging for other embryos is prevented.

The imaging of the embryos is regularly performed in a fixed cycle. That is, if the imaging is finished, the specimen container 11 is returned to the incubator and taken out again at the next imaging timing and the processing from Step S101 is repeated. If the image processing apparatus 1 and the incubator are integrated such as by placing the holder 10 in a culture environment, Step S101 can be omitted and the apparatus is in a standby state until the next imaging timing arrives. In this way, the time lapse observation of the embryos is enabled.

As just described, three-dimensional images necessary for the evaluation of the embryo can be reliably obtained by performing the OCT imaging at necessary timings while determining the development stage based on the images obtained by the optical microscope imaging capable of imaging in a relatively short time, in this embodiment, by performing the OCT imaging when judged to be necessary while enabling the time lapse observation in a relatively short period.

Next, elemental techniques for performing each Step (Steps S103 to S105, S106) of the above process are successively and separately described. Note that since the processing of obtaining the Z stack images of Step S102 is known, description is omitted. Further, the description of the processing of Step S114 is omitted since the technique described in patent literature 2 is applicable.

In Step S103, the region corresponding to the zona pellucida ZP is extracted from the two-dimensional image data obtained by optical microscope imaging of the embryo E. This processing can be performed using an appropriate image processing technique. For example, a pattern recognition technique for extracting a region having a specific characteristic from an image can be applied. Specifically, a classification model is constructed by supervised learning using an image of a zona pellucida obtained in advance as a teacher image, and an optical microscope image of the embryo E to be evaluated is divided into regions using this model. By doing so, the region corresponding to the zona pellucida ZP can be extracted from the image.

In this embodiment, a known semantic segmentation method can be, for example, used as a specific example of a region division processing. The semantic segmentation method is a technique for labelling each pixel in an image, using a classification model constructed in advance by a deep learning algorithm. In this embodiment, this method can be utilized as follows.

First, a user prepares an optical microscope image of an embryo having a zona pellucida imaged with good image quality, and each pixel of a region corresponding to the zona pellucida in the image is labeled to that effect. Then, deep learning is performed using the original optical microscope image as input data and the labeled image as ground truth data, whereby the classification model is constructed. If an unknown image is given as input data to the classification model constructed in advance in this way, it is possible to obtain an output image by labeling a region of the input image corresponding to the zona pellucida to that effect. By extracting such a region from the output image, the zona pellucida can be extracted as a result.

Figure 7:
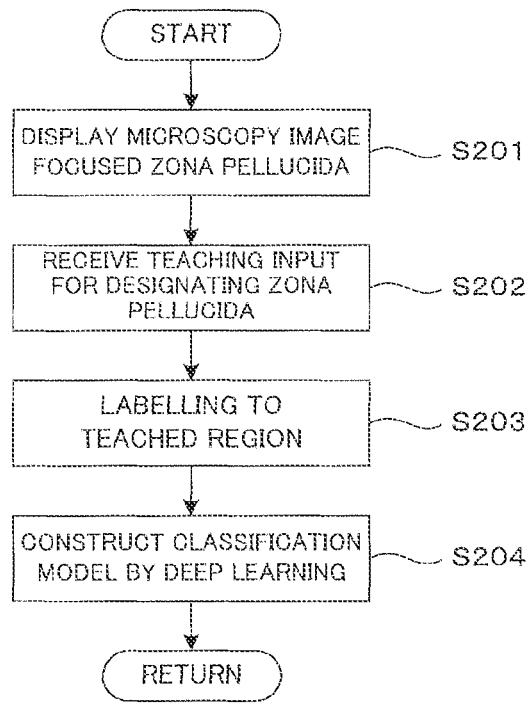
FIG. 7 is a flow chart showing an example of a specific method for constructing the classification model.

FIG. 7 is a flow chart showing an example of a specific method for constructing the classification model. This process can be performed by various computer devices having a function of displaying an image and a function of receiving an operation input from a user. For example, this process can be performed by the image processing apparatus 1 or a general-purpose computer device such as a personal computer.

At first, an optical microscope image of the embryo captured in advance with the zona pellucida set in focus (focused) is displayed (Step S201). In the image processing apparatus 1, this image can be displayed on the display 352. A teaching input from the user for designating a region corresponding to the focused zona pellucida for the image displayed in this way is received (Step S202). The user in this case is desirably a skilled person having sufficient knowledge on embryo images. Further, in the case of using the image processing apparatus 1, the teaching input can be received via the input device 351.

To the region designated as the zona pellucida, a label indicating that effect is given (Step S203). Deep learning is performed with the thus labeled image as ground truth data and the original image as input data. By doing so, the classification model for extracting the zona pellucida from the image is constructed (Step S204). If necessary, a label other than for the zona pellucida may also be used.

This classification model is constructed by using the image focused on the zona pellucida as an input image. Thus, if the semantic segmentation method is performed by applying this model to an unknown test image, a region having a strong characteristic as the zona pellucida is extracted from the test image. If the zona pellucida is extracted in this way, a thickness thereof can be calculated. To accurately calculate the thickness, the zona pellucida is desirably in focus in a maximally large region in the image. That is, it is said that the image having a maximally large area of the region extracted by the semantic segmentation method is desirable for calculation of the thickness of the zona pellucida. Note that the area can be expressed, for example, by a pixel number.

On the other hand, the embryo E to be evaluated has a three-dimensional structure. Thus, in an image captured with a focus depth determined roughly, a focused state on the zona pellucida ZP may not necessarily be satisfactory. Accordingly, one image having a largest area of the region extracted as the one equivalent to the zona pellucida ZP is selected from the Z stack images obtained with the focus position varied in the depth direction (Z direction). Then, this image is used to calculate the thickness of the zona pellucida ZP.

In Step S104, the image best focused on the zona pellucida ZP is selected from the Z stack images. In the semantic segmentation method in this embodiment, the region of the focused zona pellucida is extracted from the image. From this, it is said to be highly probable that the image having a largest area of this region is the image best focused on the zona pellucida ZP. The image falling under such conditions may be selected.

However, an image may be blurred, for example, due to vibration at the time of imaging and, as a result, an apparent area of a zona pellucida possibly appears to be larger than an actual area. So, an area extracted to be equivalent to the zona pellucida may appear to be large and this position may be erroneously determined as an in-focus position.

In this embodiment, it is possible to solve this problem by using a luminance difference between pixels sandwiching a peripheral edge part of the extracted region. That is, in a well-focused image, a boundary between the region corresponding to the zona pellucida and a surrounding region thereof is clear and, accordingly, a sharp contrast is thought to be present between luminances of those regions. On the other hand, in an unfocused image, a boundary between these regions is not clear and, accordingly, a contrast is also not sharp.

From this, an evaluation value also reflecting the magnitude of a luminance change in an edge part of the extracted region, i.e. sharpness, is introduced instead of evaluation simply based on the size of the area (pixel number) of the extracted region. By doing so, the erroneous determination as described above is thought to be possibly reduced. Various methods for quantitating such an edge change amount are available and one of them can be selected and applied as appropriate.

In this embodiment, for example, a value obtained by multiplying the area of the extracted region by a coefficient reflecting the magnitude of a luminance change in an edge part is used as an evaluation value. A value obtained by squaring a luminance difference between pixels on both sides of the edge can be used as this coefficient. More specifically, a difference between an average value of luminances of all the pixels adjacent to the edge, out of the extracted region, and an average value of luminances of all the pixels adjacent to the edge outside the edge is obtained, and the above coefficient is obtained by squaring the obtained difference.

By doing so, a risk of causing the erroneous determination of the in-focus position by an increase of the extracted area due to a deviation in the image can be reduced. Note that although the luminance difference is squared to make the coefficient a positive value, an absolute value of the luminance difference may be used as the coefficient instead.

Figure 8:
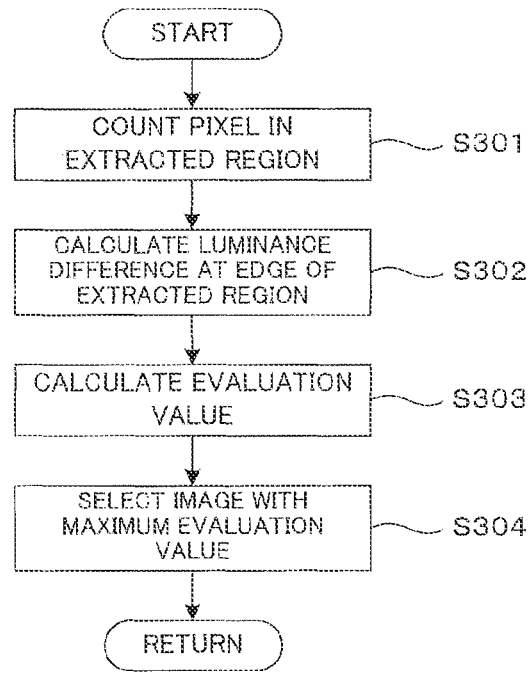
FIG. 8 is a flow chart showing a process of selecting the image focused on the zona pellucida.

FIG. 8 is a flow chart showing a process of selecting the image focused on the zona pellucida, and this processing content is equivalent to Step S104 of FIG. 6. The region corresponding to the zona pellucida is extracted in Step S103 for each image constituting the Z stack images. To obtain the area of the region extracted in this way, the number of pixels belonging to this region is counted for each image (Step S301). Then, average luminances of the adjacent pixels inside and outside an edge of the extracted region are obtained and a difference therebetween is calculated (Step S302). An evaluation value indicating a focusing degree of each image is calculated based on these values (Step S303). Specifically, the evaluation value is calculated by multiplying the pixel number of the extracted region by a coefficient expressed by a square of the luminance difference between the inside and outside of the edge. The image having a largest evaluation value obtained in this way is selected as the image best focused on the zona pellucida.

Subsequently, the processing content of Step S105 to calculate the thickness of the zona pellucida ZP from one optical microscope image selected from the Z stack images is described. The region equivalent to the zona pellucida ZP is extracted in Step S103 for the selected image. In the satisfactorily cultured embryo, a ring-shaped region having a substantially constant width is thought to be extracted as the region equivalent to the zona pellucida ZP. In the image focused on the zona pellucida ZP, the width of this ring, i.e. a distance between an inner edge and an outer edge of this ring, corresponds to the thickness of the zona pellucida ZP.

Various methods for obtaining a width of a ring are considered. A method, for example, utilizing a "Distance Transform" function provided in an open CV (Open Source Computer Vision) library is known as a simple method. By applying the Distance Transform function, using one pixel on the inner edge of the ring as a target pixel, a distance from this pixel to the closest pixel on the outer edge of the ring can be specified. This distance represents the width of the ring at that position, i.e. the thickness of the zona pellucida ZP. The calculation of a shortest distance from a pixel on the outer edge of the ring serving as a target pixel to the inner edge, on the contrary, is equivalent. The average value or the median value of the widths obtained at the respective positions on the ring can be used as an index value representing the thickness of the zona pellucida ZP.

The detailed processing contents of Steps S103 to S105 are described above. On the other hand, the entire region of the embryo can be extracted in Step S106 basically by a processing similar to that of extracting the zona pellucida ZP. Specifically, in Step S202 of FIG. 7, a teaching input may be received for a "region corresponding to the peripheral edges of cells" instead of receiving the teaching input for the "region corresponding to the zona pellucida". Teacher images in this case desirably also include images of the embryo after the expanded blastocyst stage.

A classification model constructed by deep learning using the thus taught images as correct answer data has a function of extracting a region corresponding to the entire cells from an input image by the semantic segmentation method. Processings other than this can be performed similarly to the zona pellucida extraction processing. By using a learning model obtained in this way, the processing of Step S106 to extract the entire region from the image can be performed.

Next, a modification of the image processing of the above embodiment is described. As shown in FIG. 3, the thicknesses of the zona pellucida of the embryos in the stage before the expanded blastocyst stage vary to a relatively large extent. This is thought to be due to individual variations such as different sizes of fertilized eggs from the very start. Thus, threshold values set for the thickness of the zona pellucida may vary depending on the collected images.

In view of this point, a variation due to individual differences is suppressed by using a change amount of the zona pellucida thickness from the initial stage of development as an index value instead of using the thickness of the zona pellucida itself as the index value in the following modification.

Figure 9:
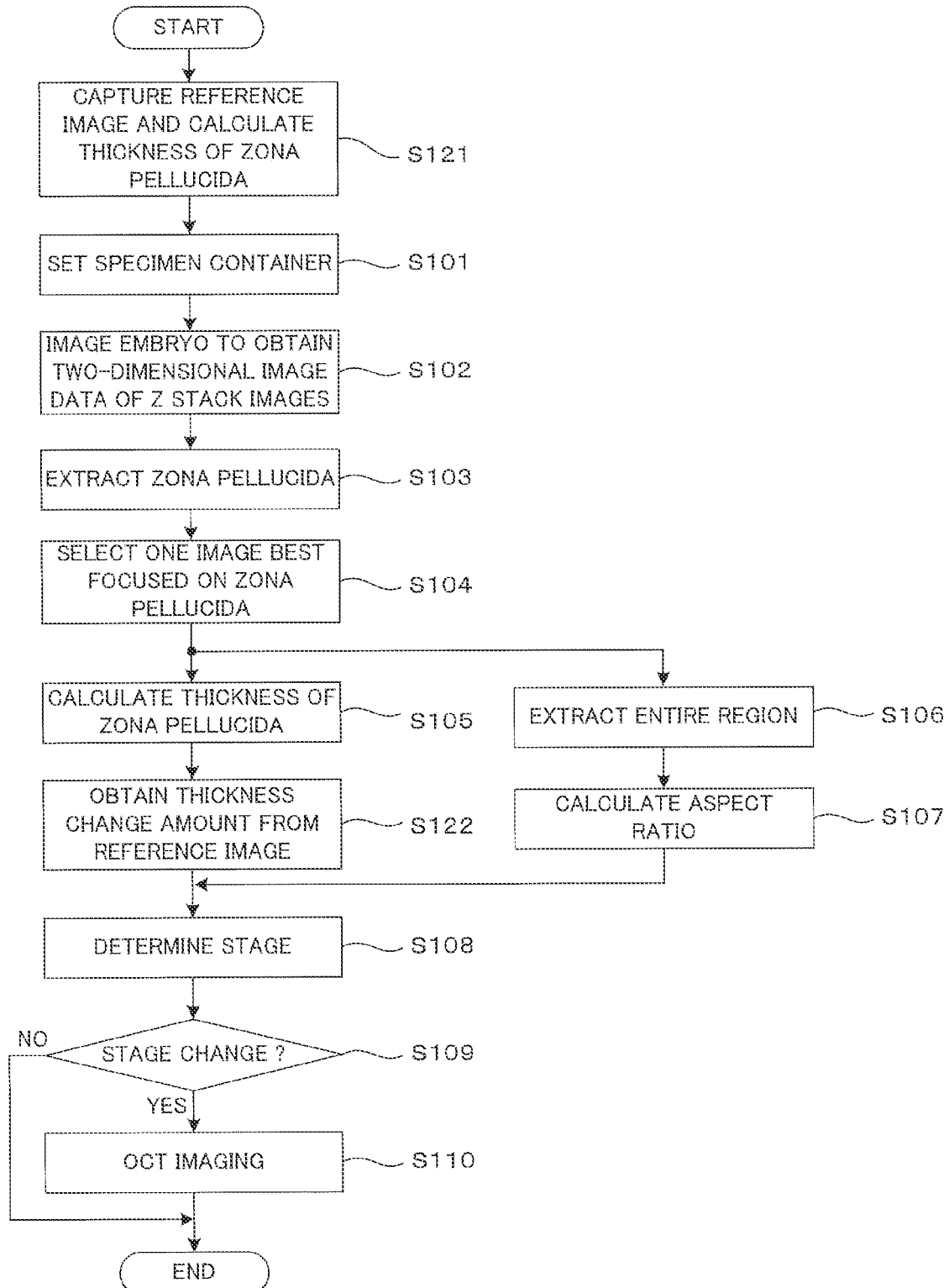
FIG. 9 is a flow chart showing the modification of the image processing.

FIG. 9 is a flow chart showing the modification of the image processing. In this modification, Step S121 is added before Step S101 and Step S122 is added after Step S105. Since the processing contents except this point are the same as those of FIG. 6, the processing steps having the same contents are denoted by the same reference signs and not described.

At first, a reference image is captured and a thickness of the zona pellucida ZP in the embryo in the reference image is calculated (Step S121). The reference image is an image of the embryo in the initial stage of development, and obtained by the optical microscope imaging of the embryo known to be in the stage before the expanded blastocyst stage in advance. By performing processings similar to those of Steps S101 to S105 using such an embryo as the specimen S, the zona pellucida thickness in the reference image can be obtained.

In Step S122, a difference or ratio of the zona pellucida thickness obtained for the embryo progressed in growth and the zona pellucida thickness in the reference image is obtained as a "thickness change amount". This thickness change amount indicates how much the zona pellucida thickness has changed as compared to the initial stage. The stage can be determined by a combination of this thickness change amount serving as one index value and the aspect ratio as in the above image processing.

FIG. 10 is a graph showing a distribution of the thickness change amounts of the zona pellucida of the embryos. As compared to FIG. 3, it is found that a value variation is suppressed particularly before the expanded blastocyst stage. From this, the stage determination is performed by combining the thickness change amount as the first index value and the second index value on the outer shape of the embryo, whereby determination accuracy is expected to be further improved.

As described above, the image processing apparatus 1 of the above embodiment corresponds to one embodiment of an "imaging apparatus" of the invention. In this embodiment, out of the imager 20, the microscopic imaging unit 28 functions as a "two-dimensional image acquirer" of the invention, and the other parts function as a "three-dimensional image acquirer" of the invention. Further, the control unit 30, particularly the CPU 31 and the signal processor 33, functions as an "image processor" of the invention.

Note that the invention is not limited to the above embodiment and various changes other than the aforementioned ones can be made without departing from the gist of the invention. For example, the image processing in the above embodiment includes up to a step of judging whether or not to perform the OCT imaging based on the result of the stage determination and performing the OCT imaging if necessary. However, constituent elements of the fertilized egg development stage determination method according to the invention include up to a step of obtaining an optical microscope image and determining the development stage of the embryo, and the use of the determination result is arbitrary without being limited to the above judgment as to whether or not the OCT imaging is necessary. Therefore, the stage determination method of the invention can be executed using an optical microscope not having the OCT imaging function.

Further, for example, the image processing apparatus 1 of the above embodiment has the function of performing the OCT imaging and the optical microscope imaging of the specimen S and the function of generating and outputting an output image from imaging data. However, the development stage determination method of the invention can be also executed by a computer device having acquired imaging data obtained by imaging in another device having the imaging function without having the imaging function itself. To enable this, the invention may be carried out as a software program for causing the computer device to perform the respective processing steps of FIG. 6 except Step S101.

Such a program can be delivered, for example, by downloading via an electric communication line such as the Internet. This program can also be delivered in the form of a computer-readable recording medium non-transitorily storing the program. Further, by causing an existing imaging device having the optical microscope imaging function and the OCT imaging function to read this program via an interface, the invention can be carried out by this apparatus.

Further, the above embodiment is configured to perform the OCT imaging for the embryo having a change in the development stage from the development stage determination result. That is, a criterion in judging whether or not the OCT imaging is necessary is whether or not the development stage has changed. However, the criterion in judging whether or not the OCT imaging is necessary from the stage determination result is not limited to this.

As the specific embodiment has been illustrated and described above, the determination criteria can be determined based on the index values respectively indicating the degree of coincidence and the thickness obtained from the images of the plurality of fertilized eggs and the information representing in which development stage the fertilized eggs are in the fertilized egg development stage determination method according to the invention. If there are a plurality of images of the embryo having usable information representing in which development stage the embryo is, a correlation between the index values obtained from those images and the development stage of the embryo can be specified, and that result can be utilized as a determination criterion in the stage determination of an unknown embryo.

Further, for example, the determination criteria can be determined by dividing the two-dimensional feature quantity space having the index value indicating the degree of coincidence and the index value indicating the thickness respectively as feature quantities into a plurality of regions according to the values of these index values and associating each region with the development stage. More specifically, a method for setting a threshold value for each of the index value indicating the degree of coincidence and the index value indicating the thickness and dividing the two-dimensional feature quantity space into a plurality of regions by the threshold values or a method for dividing the two-dimensional feature quantity space into a plurality of regions by boundaries of clusters of each development stage in which images of a plurality of fertilized eggs are formed in the two-dimensional feature quantity space can be applied.

Further, for example, the determination criteria can divide the two-dimensional feature quantity space having the index value indicating the degree of coincidence and the index value indicating a thickness change from the reference image captured in advance respectively as feature quantities into a plurality of regions according to the values of these index values and associate each region with the development stage. The thickness of the zona pellucida possibly varies even among the embryos in the same development stage depending on the individual differences of the fertilized eggs. Therefore, in the case of directly using the thickness of the zona pellucida as the index value, the determination results may vary. For example, if a change amount with time of the zona pellucida thickness in each embryo is used as the index value, a variation due to such individual differences can be suppressed.

In these methods, the index value indicating the degree of coincidence can be, for example, expressed as a ratio of long sides and short sides of a circumscribing rectangle of a fertilized egg in an image. A calculation function of searching a circumscribing rectangle of an image object is normally equipped in a general image processing software. By utilizing this, one of the index values serving as the determination criteria of the embryo can be easily derived.

The fertilized egg development stage determination method according to the invention can be utilized for the purpose of determining which of the stage before expanded blastocyst stage, the expanded blastocyst stage and the stage after the expanded blastocyst stage the development stage of the fertilized egg is. According to the aforementioned findings of the inventors of this application, each of these development stages can be effectively discriminated by combining the index value on the thickness of the zona pellucida and the index value on the outer shape of the entire embryo.

For example, if the index value indicating the thickness is larger than the threshold value set for this index value, the development stage of the fertilized egg can be determined to be the stage before the expanded blastocyst stage. Further, if the index value indicating the thickness is smaller than the threshold value set for this index value and the index value indicating the degree of coincidence is larger than the threshold value set for this index value, the development stage of the fertilized egg can be determined to be the expanded blastocyst stage.

Further, in the fertilized egg development stage determination method according to the invention, the region corresponding to the zona pellucida may be extracted using a classification algorithm obtained by machine learning images of zona pellucida obtained by the optical microscope imaging as teacher images. According to such a configuration, a region having strong morphological features of the zona pellucida can be extracted with high accuracy from the images obtained by the optical microscope imaging by using an appropriate classification algorithm.

For example, the semantic segmentation method can be used as the classification algorithm. According to this method, an image can be divided on a pixel basis according to a characteristic of the image. Thus, a region of a zona pellucida can be accurately extracted from a microscope image and the thickness thereof can be properly evaluated.

Further, for example, the optical microscope imaging of the fertilized egg may be performed a plurality of times with a focus depth varied, and an average thickness of the zona pellucida may be obtained from an image having a largest area of a region corresponding to the zona pellucida, out of those images. There is a high probability that the image in which the zona pellucida is extracted in a wide range is an image best focused on the zona pellucida, i.e. captured in a state where the zona pellucida is clear. By using such an image, the thickness of the zona pellucida can be accurately obtained.

This invention can be applied for the purpose of assisting an operation of evaluating a state of a cultured embryo and suitable for the purpose of capturing a three-dimensional image of an embryo at necessary timings by regularly observing the embryo, for example, in the assisted reproductive technology.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A fertilized egg development stage determination method, comprising:
    obtaining image data corresponding to an image of a fertilized egg captured by an optical microscope;
    extracting a region corresponding to the fertilized egg in the image based on the image data and obtaining an index value indicating a degree of coincidence of the region with a circle;
    extracting a region corresponding to a zona pellucida of the fertilized egg in the image based on the image data and obtaining an index value indicating a thickness of the region; and
    determining a development stage of the fertilized egg based on the index value indicating the degree of coincidence, the index value indicating the thickness and determination criteria determined in advance for a combination of these index values,
    wherein the determination criteria are determined based on:
        the index values respectively obtained from images of a plurality of fertilized eggs and indicating the degree of coincidence; and
        the thickness and information representing the development stage of each of the plurality of fertilized eggs, and
    wherein the determination criteria divide a two-dimensional feature quantity space into a plurality of regions according to these index values and associate each region with the development stage, the two-dimensional feature quantity space having the index value indicating the degree of coincidence and the index value indicating the thickness respectively as feature quantities.

2. The fertilized egg development stage determination method according to claim 1, wherein threshold values are respectively set for the index value indicating the degree of coincidence and the index value indicating the thickness and
    the two-dimensional feature quantity space is divided into a plurality of regions by the threshold values.

3. The fertilized egg development stage determination method according to claim 1, wherein the two-dimensional feature quantity space is divided into a plurality of regions by boundaries of clusters of each development stage in which images of the plurality of fertilized eggs are formed in the two-dimensional feature quantity space.

4. The fertilized egg development stage determination method according to claim 1, wherein the determination criteria divide a two-dimensional feature quantity space into a plurality of regions according to these index values and associate each region with the development stage, the two-dimensional feature quantity space having the index value indicating the degree of coincidence and an index value indicating a change of the thickness from a reference image captured in advance respectively as feature quantities.

5. The fertilized egg development stage determination method according to claim 1, wherein the index value indicating the degree of coincidence is expressed as a ratio of long sides and short sides of a circumscribing rectangle of the fertilized egg in the image.

6. The fertilized egg development stage determination method according to claim 1, wherein the index value indicating the thickness is a value corresponding to a change amount with time of a thickness of a region corresponding to the zona pellucida.

7. The fertilized egg development stage determination method according to claim 1, wherein in which of a stage before an expanded blastocyst stage, the expanded blastocyst stage and a stage after the expanded blastocyst stage the development stage of the fertilized egg is determined.

8. The fertilized egg development stage determination method according to claim 7, wherein the development stage of the fertilized egg is the stage before the expanded blastocyst stage if the index value indicating the thickness is larger than a threshold value set for this index value.

9. The fertilized egg development stage determination method according to claim 7, wherein the development stage of the fertilized egg is the expanded blastocyst stage if the index value indicating the thickness is smaller than a threshold value set for this index value and the index value indicating the degree of coincidence is larger than a threshold value set for this index value.

10. The fertilized egg development stage determination method according to claim 1, wherein a region corresponding to the zona pellucida is extracted using a classification algorithm obtained by machine learning images of the zona pellucida obtained by optical microscope imaging as teacher images.

11. The fertilized egg development stage determination method according to claim 10, wherein a semantic segmentation method is used as the classification algorithm.

12. The fertilized egg development stage determination method according to claim 10, wherein imaging of the fertilized egg with the optical microscope is performed a plurality of times with different focus depths, and
    the thickness of the zona pellucida is obtained from the image having a largest area of the region corresponding to the zona pellucida, out of those images.

13. An imaging method, comprising:
determining the development stage of the fertilized egg by the fertilized egg development stage determination method according to claim 1; and
performing optical coherence tomography imaging of the fertilized egg according to a determination result.

14. An imaging apparatus, comprising:
a two-dimensional image acquirer configured to obtain two-dimensional image data by imaging of a fertilized egg with an optical microscope;
a three-dimensional image acquirer configured to obtain three-dimensional image data by imaging of the fertilized egg with an optical coherence tomography; and
an image processor configured to extract a region corresponding to the fertilized egg in the image based on the two-dimensional image data, obtain an index value indicating a degree of coincidence of the region with a circle, extract a region corresponding to a zona pellucida of the fertilized egg in the image based on the two-dimensional image data, obtain an index value indicating a thickness of the region and determine a development stage of the fertilized egg based on the index value indicating the degree of coincidence, the index value indicating the thickness and determination criteria determined in advance for a combination of these index values,
the imaging of the fertilized egg with the optical coherence tomography being performed by the three-dimensional image acquirer according to a determination result of the image processor.

* * * * *